March 8, 1949. G. A. ELLESTAD 2,463,956
SPRING CONNECTION MEANS FOR PLASTIC SPECTACLES
Filed Aug. 11, 1945

Gerhard A. Ellestad
INVENTOR
BY
ATTORNEY

Patented Mar. 8, 1949

2,463,956

UNITED STATES PATENT OFFICE 2,463,956

SPRING CONNECTION MEANS FOR PLASTIC SPECTACLES

Gerhard A. Ellestad, Rochester, N. Y., assignor to Bausch & Lomb Optical Company, Rochester, N. Y., a corporation of New York Application August 11, 1945, Serial No. 610,318

1 Claim. (Cl. 88—41)

This invention relates to ophthalmic mountings and more particularly it has reference to means for securing the lenses to a non-metallic frame having rims that partially surround the upper portions of the lenses.

One of the objects of this invention is to provide an ophthalmic mounting of the type described which will be durable in construction, efficient in operation, and neat in appearance. A further object is to provide an ophthalmic mounting of the type described in which the lenses may be readily mounted and securely held. Still another object is to provide a mounting of the type described in which the lenses are resiliently and hingedly mounted to the frame member so that stresses which affect the frame are not transmitted to the lenses and hence lens breakage will be reduced to a minimum. These and other objects and advantages reside in certain novel features of the construction, arrangement, and combination of parts as will hereinafter be more fully described and pointed out in the appended claim.

Referring to the drawings.

Figure 1:
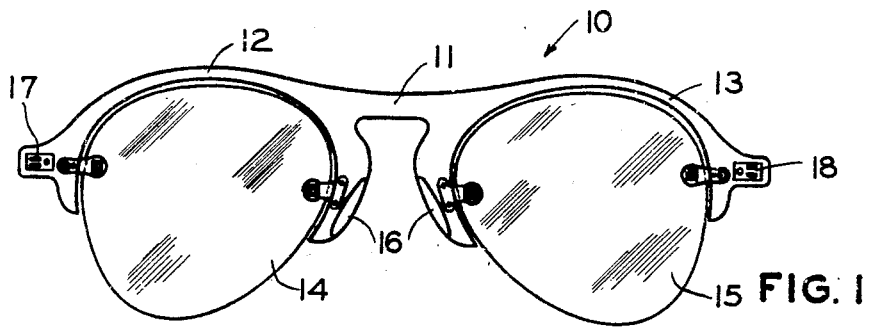
Fig. 1 is a rear elevation of an ophthalmic mounting, with temples removed, embodying my invention.

A preferred embodiment of my invention is disclosed in the drawing wherein 10 indicates, generally, a frame having a bridge portion 11 connecting the spaced rim members 12 and 13 which extend, respectively, along the temporal, upper and nasal edges of the lenses 14 and 15. As clearly shown in the drawing, the rim members 12 and 13 do not extend around the bottom portion of the lenses so that the mounting is of a semi-rimless type. The frame member 10 is preferably integrally formed of any suitable plastic or other non-metallic material. The bridge portion 11 carries the integrally formed nose pads 16 which engage the nose of the wearer. The usual metal temple hinge members 17 and 18 are carried on the rear faces of the temporal portions of the rim members 12 and 13 and are secured thereto by any suitable means, such as rivets 19 coacting with plates 20 positioned on the front surfaces of the members 12 and 13.

Figures 2, 3:
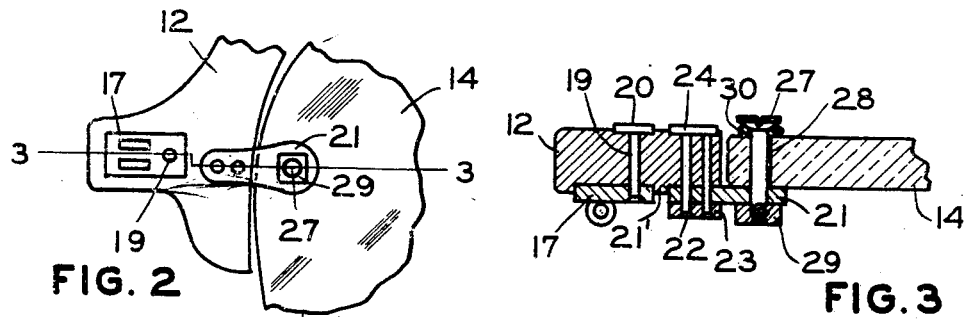
Fig. 2 is an enlarged fragmentary view of the rear temporal portion of the mounting.
Fig. 3 is a sectional view taken on line 3—3 of Fig. 2.

The lenses 14 and 15 are secured to the respective rim members 12 and 13 by means of flat spring elements 21 which are positioned at the temporal and nasal edges of the rim members and project laterally therefrom onto the rear surfaces of the lenses. At the temporal edges, the spring elements 21 are secured to the rim members by means of the rivets 22 which pass through aligned apertures formed in the element, a rear plate 23 and a front plate 24. At the nasal edges, the elements 21 are secured by rivets 25 which pass through aligned apertures in the element 21, a rear plate 26 and a front plate, not shown. As shown in Fig. 3, the lens 14 is secured to the element 21 by means of a screw 27 which passes through lens aperture 28 and an aligned aperture in the element 21 and threadedly received the nut 29. A suitable spring washer or the like 30 may be positioned between the head of the screw 27 and the front surface of the lens. Similar connections are employed at the nasal edges for securing the lenses to the resilient elements 21. Since the elements 21 are resilient, they will tend to act as hinge elements with the fulcrum axis located substantially at the edges of rear plates 23 and 26 adjacent the edges of the lenses. The resilient elements 21 are preferably positioned in recesses, such as 21', which are formed on the rear faces of the rim members.

Figures 4, 5:
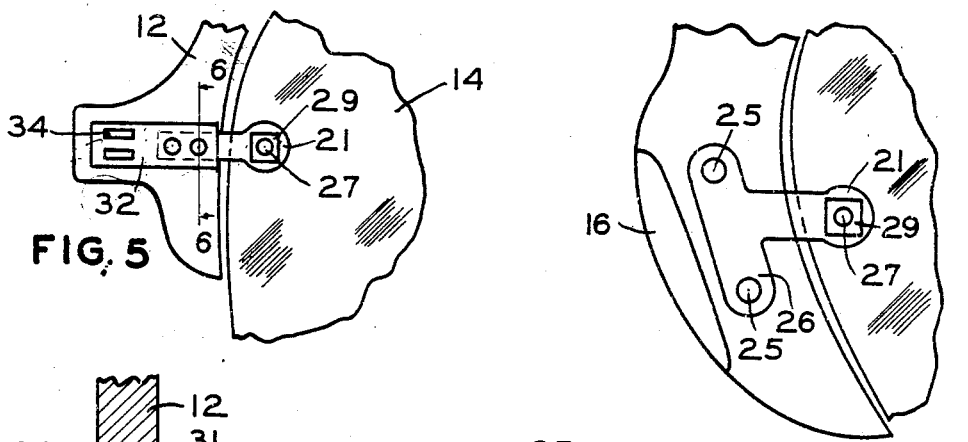
Fig. 4 is an enlarged fragmentary view showing the means for securing the lens to the nasal side of the mounting.
Fig. 5 is a view of a modification showing the relation of the resilient hinge element and the temple hinge plate.
Figures 6, 7:
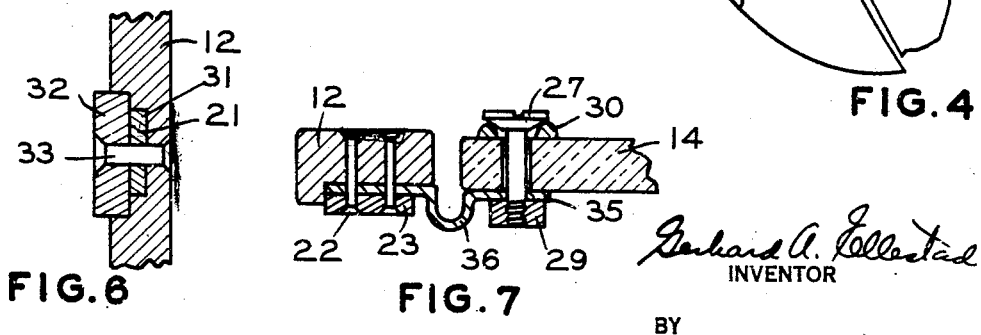
Fig. 6 is a sectional view taken on line 6—6 of Fig. 5.
Fig. 7 shows a sectional view of a modified form of a resilient hinge element.

In the modification shown in Figs. 5 and 6, the resilient hinge element 21 is positioned in a recess 31 formed in the rear face of rim member 12. A plate 32 is positioned in contact with the element 21 and the plate 32 and the element 21 are secured to the rim member 12 by means of rivets 33 which extend through aligned apertures in the parts. The plate 32 also carries the hinge elements 34 which receive the temple hinge in the usual manner. In Fig. 7 there is shown a modified form of resilient hinge element 35 which has an integrally formed loop 36 which is positioned substantially opposite the slight space formed between the edge of the lens and the adjacent rim member. Added resilient effects and adjustability of parts are attained by provision of the loop 36 in the resilient hinge element 35.

From the foregoing it will be apparent that I am able to attain the objects of my invention and provide an improved type of ophthalmic mounting having a non-metallic frame of the semi-rimless type. Since the lenses are hingedly and resiliently held in the mounting, any stresses which are accidentally applied to the frame will not be communicated to the lenses. Lenses of varying thicknesses can readily be mounted with a minimum of effort. Such a mounting will, therefore, reduce lens breakage while still affording a neat appearance. Various modifications can obviously be made without departing from the spirit of my invention as pointed out in the appended claim.

I claim:

An ophthalmic mounting comprising a pair of spaced rim members, a bridge connecting said members, said rim members partially encircling a pair of lenses and having portions extending along the top, temporal and nasal edges of the lenses, said members lying substantially in the planes of the lenses, and means at the temporal and nasal sides of the lenses for attaching the lenses to the members, said means comprising a plurality of substantially flat springs, one end of each spring being secured to the respective nasal and temporal portions of the members so that the free ends of the springs project laterally beyond the portions and over the adjacent surfaces of the lenses, the free ends of the springs having apertures for receiving screws passed through apertures in the lenses, plates mounted over the attached ends of the springs and extending substantially to the edges of the members whereby the edges of the plates form substantially vertical fulcrums against which the springs flex as the lenses and frame move relative to each other.

GERHARD A. ELLESTAD.

REFERENCES CITED

The following references are of record in the file of this patent:

UNITED STATES PATENTS

| Number | Name | Date |
|---|---|---|
| 1,471,360 | Sangren | Oct. 23, 1923 |
| 1,971,128 | Braucht et al. | Aug. 21, 1934 |
| 2,243,681 | Pomeranz | May 27, 1941 |
| 2,256,502 | Splaine | Sept. 23, 1941 |
| 2,301,328 | Rochte | Nov. 10, 1942 |
| 2,344,230 | Brown | Mar. 14, 1944 |
| 2,357,267 | Rohrbach | Aug. 29, 1944 |
| 2,372,059 | Cook | Mar. 20, 1945 |
| 2,436,606 | Rohrbach | Feb. 24, 1948 |

FOREIGN PATENTS

| Number | Country | Date |
|---|---|---|
| 16,123 | Great Britain | Aug. 28, 1895 |